United States Patent
Halepovic et al.

(10) Patent No.: US 10,757,220 B2
(45) Date of Patent: Aug. 25, 2020

(54) ESTIMATING VIDEO QUALITY OF EXPERIENCE METRICS FROM ENCRYPTED NETWORK TRAFFIC

(71) Applicants: AT&T Intellectual Property I, L.P., Atlanta, GA (US); Georgia Institute of Technology, Atlanta, GA (US)

(72) Inventors: Emir Halepovic, Somerset, NJ (US); Tarun Mangla, Atlanta, GA (US); Mostafa H. Ammar, Smyrna, GA (US); Ellen Witte Zegura, Decatur, GA (US)

(73) Assignees: AT&T Intellectual Property I, L.P., Atlanta, GA (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/216,072

(22) Filed: Dec. 11, 2018

(65) Prior Publication Data
US 2020/0186615 A1   Jun. 11, 2020

(51) Int. Cl.
| | | |
|---|---|---|
| *G06F 15/173* | (2006.01) | |
| *H04L 29/08* | (2006.01) | |
| *H04N 21/647* | (2011.01) | |
| *H04L 29/06* | (2006.01) | |
| *H04N 21/24* | (2011.01) | |
| *H04N 21/2662* | (2011.01) | |
| *H04N 21/2381* | (2011.01) | |

(52) U.S. Cl.
CPC ........ *H04L 67/322* (2013.01); *H04L 63/0485* (2013.01); *H04L 67/02* (2013.01); *H04N 21/2381* (2013.01); *H04N 21/2402* (2013.01); *H04N 21/2662* (2013.01); *H04N 21/647* (2013.01)

(58) Field of Classification Search
CPC .............. H04L 29/06; H04L 29/08072; H04L 29/08756; H04L 29/0809; H04L 29/06068; H04L 29/06095; H04L 67/322; H04L 67/02; H04L 63/0485; H04N 21/647; H04N 21/2402; H04N 21/2662; H04N 21/2381
See application file for complete search history.

(56) References Cited

U.S. PATENT DOCUMENTS

| | | | | |
|---|---|---|---|---|
| 7,787,622 B2* | 8/2010 | Sprunk | ................... | H04N 7/163 380/37 |
| 2014/0269776 A1* | 9/2014 | Bomfim | ............. | H04N 21/8456 370/503 |
| 2014/0317402 A1* | 10/2014 | Moon | ................. | H04L 63/0428 713/160 |
| 2014/0337620 A1* | 11/2014 | Swaminathan | .. | H04N 21/23439 713/160 |
| 2015/0120208 A1* | 4/2015 | Park | ....................... | G16B 30/00 702/19 |
| 2015/0281089 A1* | 10/2015 | Marchetti | ............. | H04L 47/125 370/235 |

* cited by examiner

*Primary Examiner* — Abdullahi E Salad (57) ABSTRACT

In one example, a processing system including at least one processor obtains a transport control protocol flow associated with a video session that streams a video from a server to a client. The transport control protocol flow comprises a plurality encrypted packets exchanged between the server and the client. The processing system then reconstructs a hypertext transfer protocol transaction that is part of the streaming video session. The reconstructing is performed without decrypting the plurality of encrypted packets.

20 Claims, 4 Drawing Sheets

ESTIMATING VIDEO QUALITY OF EXPERIENCE METRICS FROM ENCRYPTED NETWORK TRAFFIC

This invention was made with government support under contract number CNS-1409589 awarded by the National Science Foundation. The government has certain rights in the invention.

The present disclosure relates generally to video streaming, and more particularly relates to devices, non-transitory computer-readable media, and methods for estimating video Quality of Experience (QoE) metrics for video streams delivered over encrypted transport protocols.

BACKGROUND

A measure for how efficiently an adaptive bitrate (ABR) video stream is delivered and for the quality in which the stream is being presented on the screen of a device can be referred to as a "Quality of Experience" (QoE). QoE is a user-perceived measure, but understanding QoE helps content providers, content distributors, and network operators to provider a better experience for users who stream videos over a network. For instance, understanding QoE may help a network operator to efficiently provision and manage the network in a manner that meets user expectations (e.g., by managing carrier additions, evaluating traffic management solutions, detecting problems with network configurations, and the like). However, monitoring QoE can be a challenge for network operators, since QoE is: (a) subjective (i.e., variable from user to user); and (b) application-specific (i.e., variable from application to application).

Since network operators may not have access to the video streaming applications, user devices, and/or servers used to stream the videos, it may be impossible for the network operators to obtain objective measures of the metrics that influence QoE. As such, the network operators may infer metrics that influence video QoE from passive measurements of the network traffic that delivers the video streams.

SUMMARY

In one example, a processing system including at least one processor obtains a transport control protocol flow associated with a video session that streams a video from a server to a client. The transport control protocol flow comprises a plurality encrypted packets exchanged between the server and the client. The processing system then reconstructs a hypertext transfer protocol transaction that is part of the streaming video session. The reconstructing is performed without decrypting the plurality of encrypted packets.

In another example, a non-transitory computer-readable medium stores instructions which, when executed by a processing system including at least one processor, cause the processing system to perform operations. The operations include obtaining a transport control protocol flow associated with a video session that streams a video from a server to a client, wherein the transport control protocol flow comprises a plurality encrypted packets exchanged between the server and the client and reconstructing a hypertext transfer protocol transaction that is part of the streaming video session, wherein the reconstructing is performed without decrypting the plurality of encrypted packets.

In another example, a device includes a processing system including at least one processor and a computer-readable medium storing instructions which, when executed by the processing system, cause the processing system to perform operations. The operations include obtaining a transport control protocol flow associated with a video session that streams a video from a server to a client, wherein the transport control protocol flow comprises a plurality encrypted packets exchanged between the server and the client and reconstructing a hypertext transfer protocol transaction that is part of the streaming video session, wherein the reconstructing is performed without decrypting the plurality of encrypted packets.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a device, computer-readable medium, and methods for estimating video Quality of Experience (QoE) metrics for video streams delivered over encrypted transport protocols. QoE may be influenced by several factors. For example, if the video quality of an adaptive bitrate (ABR) video stream is too high (e.g., maximum spatial resolution, frame rate, etc.), then delivery quality may suffer (e.g., in the form of increased video startup time, frequency and duration of stalls during playback to allow for buffering, etc.). As discussed above, network service providers that provide and/or facilitate delivery of ABR video streams may seek to balance video quality with delivery quality, in order to maintain a QoE that is acceptable to the user while minimizing waste of network resources.

Understanding QoE may help a network operator to provision and manage the network in a manner that improves the user experience. However, monitoring QoE can be a challenge for network operators, who may not have access to the video streaming applications, user devices, and/or servers used to stream the videos, and thus cannot obtain objective measures of the metrics that influence QoE. As such, the network operators may infer metrics that influence video QoE from passive measurements of the network traffic that delivers the video streams. However, when the network traffic that delivers the video streams is encrypted (as is often the case for subscription-based video streaming services), inferring QoE metrics becomes even more challenging as visibility into the network traffic is lost.

Examples of the present disclosure exploit understanding of the underlying traffic patterns of HTTP-based video delivery protocols. For instance, examples of the present disclosure may reconstruct a "chunk"-based video delivery sequence from encrypted network traffic without decrypting the packets containing the video chunks (e.g., using only packet-level data such as traffic direction and packet sizes). The reconstructed delivery sequence can subsequently be used to model a video session based on high-level properties of the video streaming technique that tend to be consistent across services. From the model, examples of the present disclosure can then estimate a plurality of metrics that influence QoE, such as average bitrate, re-buffering ratio, bitrate switches, and startup delay. The impacts of the estimated metrics may be used to further model the user experience (e.g., through user studies and/or objective data analysis).

Examples of the present disclosure are compatible with a variety of encrypted transport protocols, including hypertext transfer protocol (HTTP)-based adaptive streaming (HAS), HTTP/transport layer security (TLS), quick user datagram protocol (UDP) Internet connections (QUIC), and other protocols. Although examples of the present disclosure are discussed within the context of HAS video sessions, such examples are not intended to be limiting.

In HAS, a video is split into a plurality of "chunks," or sequences of video and/or audio frames for a time block of video. The chunks may be of equal duration. Each chunk is encoded at one or more predefined bitrates (e.g., a target bitrate or "encoding level") and hosted on an HTTP server. A player device may include bitrate adaptation logic that selects the bitrate of the chunks to be downloaded. The video metadata such as bitrate, screen resolution, request uniform resource locator (URL), and other information that may be used to request and obtain chunks for playback may be obtained by the player device by downloading a manifest file at the beginning of a video session.

In one example, a chunk may be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In this case, the chunk be referred to as a "fragment." In addition, such a chunk (e.g., a fragment) may be obtained via a URL identifying the file containing the chunk and a byte range, timestamp, index, sequence number, or the like to distinguish the chunk from other chunks in the same file.

The network traffic corresponding to the chunks in a HAS video session comprises a sequence of HTTP GET requests and responses. When the player device requests the video, the player first downloads the manifest file by sending a first HTTP GET request to the server. The server delivers the manifest file in a corresponding first HTTP GET response. The player sends a subsequent HTTP GET request for the first chunk of the video and receives a corresponding subsequent HTTP GET response including the first chunk. Once the first chunk has been fully downloaded by the player device, the player sends an HTTP GET request for the next chunk, and so on. The bitrate of any given chunk in the video session may be selected based on the past chunk throughput and/or the current buffer occupancy at the player device. As discussed in greater detail below, this strong serial request/response pattern corresponding to chunk downloads can be used to model the HAS video session.

A variety of factors may affect a user's QoE for video streaming. These include video stalls, startup delay, and poor video/audio quality. Adaptive bitrate (ABR) streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants) and stored on servers as separate files. A video client running on a mobile device, a home television, a game console, a web browser, or the like chooses which video rate to stream by monitoring network conditions and estimating the available network capacity.

Examples of the present disclosure may be utilized in lab testing, delivery of ABR streaming video to smart TVs, set-top-boxes, personal computers, and the like at customer premises, and in drive testing environments for cellular and non-cellular wireless delivery of ABR streaming video to mobile devices, such as smartphones, laptop computers, tablet computers, and the like. Accurate objective measurement of video quality and delivery quality enables total streaming system tuning.

Examples, of the present disclosure may be practically implemented within any existing HAS system. It should also be noted that although examples of the present disclosure are described primarily in connection with a video client and video streaming, examples of the present disclosure may be similarly applied to other types of streaming media, such as adaptive bitrate streaming audio. In addition, although aspects of the present disclosure may be most applicable in the context of live streaming with shallow buffers, the present disclosure may be equally applicable to on-demand streaming of recorded programs. For instance, examples of the present disclosure may be particularly useful for QoE measurements for live video, where variants and/or chunks may only be available for a short period of time on one or more network-based servers. These and other aspects of the present disclosure are described in greater detail below in connection with the examples of FIGS. 1-4.

Figure 1:
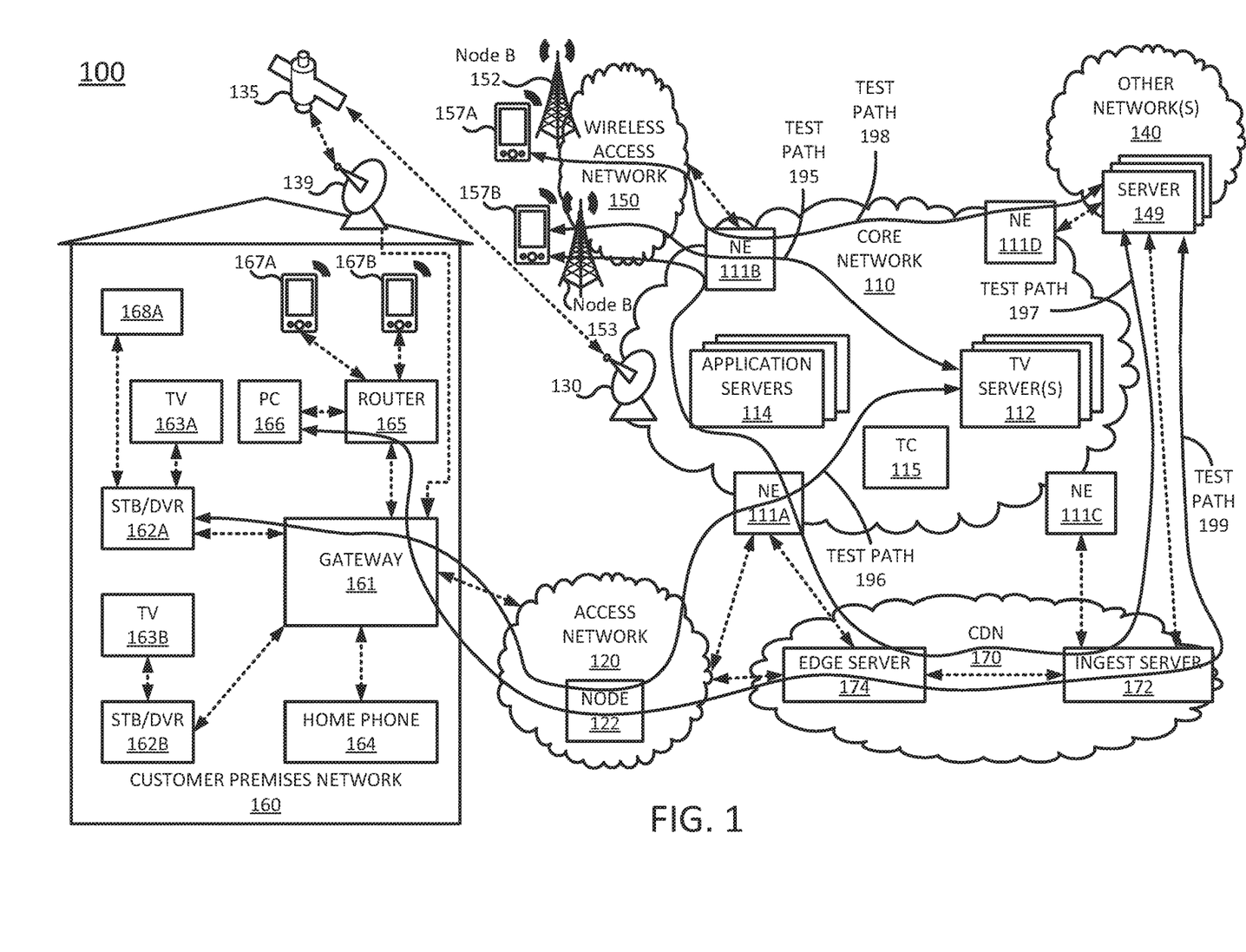
FIG. 1 illustrates an example network related to the present disclosure.

To better understand the present disclosure, FIG. 1 illustrates an example system 100 (e.g., comprising one or more networks), related to the present disclosure. As shown in FIG. 1, the system 100 connects mobile devices 157A, 157B, 167A and 167B, and home network devices such as home gateway 161, set-top boxes (STBs) 162A and 162B, television (TV) 163A and TV 163B, phone 164, router 165, personal computer (PC) 166, and so forth, with one another and with various other devices via a telecommunication network 110, a wireless access network 150 (e.g., a cellular network), an access network 120, other networks 140, content distribution network (CDN) 170, and/or the Internet in general. For instance, connections between telecommunication network 110, access network 120, customer premises network 160 (e.g., a home network, an enterprise network, etc.), CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as telecommunication network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, system 100 includes a telecommunication network 110. In one example, telecommunication network 110 may combine core network components of a cellular network with components of a triple play service network; where triple play services include telephone services, Internet services and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the telecommunication network 110 with other networks 140, wireless access network 150, access network 120, and so forth. As shown in FIG. 1, telecommunication network 110 may also include a plurality of television (TV) servers 112, and a plurality of application servers 114.

In accordance with the present disclosure, telecommunication network 110 may also include a test controller (TC) 115 (e.g., a processing system comprising one or more servers) configured to perform various operations in connection with examples of the present disclosure for estimating video QoE metrics from encrypted network traffic. In one example, test controller 115 may comprise all or a portion of a computing device or system, such as computing system 400, and/or processing system 402 as described in connection with FIG. 4 below, specifically configured to perform various steps, functions, and/or operations for estimating video QoE metrics from encrypted network traffic, as described herein. The functionality of test controller 115 is described in greater detail below in connection with test systems that may include various test devices, ABR video source devices, and so forth.

Figure 4:
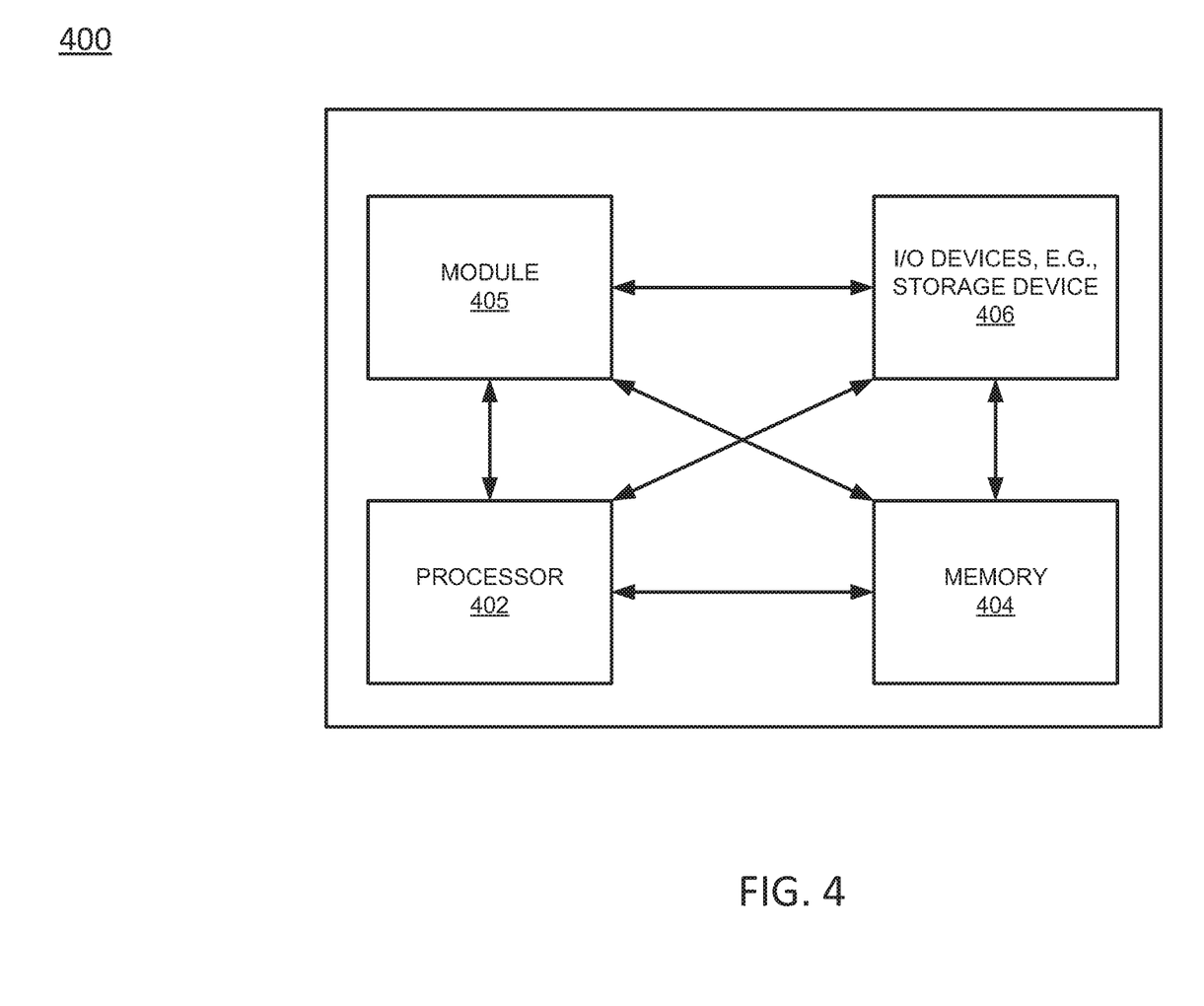
FIG. 4 illustrates a high level block diagram of a computing device specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. For ease of illustration, various additional elements of telecommunication network 110 are omitted from FIG. 1.

With respect to television service provider functions, telecommunication network 110 may include one or more television servers 112 for the delivery of television content, e.g., a broadcast server, a cable head-end, and so forth. For example, telecommunication network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the telecommunication network 110 for distribution to various subscribers, e.g., for live content, such as news programming, sporting events, and the like. Television servers 112 may also include advertising server(s) to store a number of advertisements that can be selected for presentation to viewers, e.g., in the customer premises network 160 and at other downstream viewing locations. For example, advertisers may upload various advertising content to the telecommunication network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of telecommunication network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between customer premises network 160 and telecommunication network 110 relating to voice telephone calls, communications with web servers via other networks 140, content distribution network (CDN) 170 and/or the Internet in general, and so forth. In another example, access network 120 may be operated by a different entity from telecommunication network 110, e.g., an Internet service provider (ISP) network.

Alternatively, or in addition, the system 100 may provide television services to customer premises network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the telecommunication network 110. In another example, satellite 135 may be controlled and/or operated by a different entity and may carry television broadcast signals on behalf of the telecommunication network 110.

As illustrated in FIG. 1, telecommunication network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming videos maintained within TV servers 112 and/or available to subscribers of telecommunication network 110 and stored in server(s) 149 in other networks 140. It should be noted that the foregoing are only several examples of the types of relevant application servers 114 that may be included in telecommunication network 110 for storing information relevant to providing various services to subscribers.

In accordance with the present disclosure, other networks 140 and servers 149 may comprise networks and devices of various content providers of ABR videos. In one example, each of servers 149 may also make available manifest files which describe the variants of a video and the video chunks thereof which are stored on the respective one of the servers 149. For instance, there may be several video chunks containing video and audio for the same time block (e.g., a 2-10 second portion) of the video, but which are encoded at different bitrates in accordance with an adaptive bitrate streaming protocol. Thus, an adaptive bitrate streaming video player may request and obtain any one of the different video chunks for the time block, e.g., depending upon a state of a video buffer of the adaptive bitrate streaming video player, depending upon network bandwidth or other network conditions, depending upon the access rights of the adaptive bitrate streaming video player to different variants (e.g., to different encoding levels/bitrates) according to a subscription plan and/or for the particular video, and so forth.

In one example, customer premises network 160 may include a gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in customer premises network 160 via wired and/or wireless connections.

Among other functions, STB/DVR 162A and STB/DVR 162B may comprise adaptive bitrate streaming video players capable of playing adaptive bitrate streaming videos in formats such as H.264 (Advanced Video Coding (AVC)), H.265 (High Efficiency Video Coding (HEVC)), Moving Picture Expert Group (MPEG) .mpeg files, .mov files, .mp4 files, .3gp files, .f4f files, .m3u8 files, or the like. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for estimating video QoE metrics from encrypted network traffic, as described herein. For instance, one or more of mobile devices 157A, 157B, 167A and 167B, STB/DVRs 162A and 162B, and/or PC 166 may also comprise all or a portion of a computing device or system, such as computing system 400, and/or processing system 402 as described in connection with FIG. 4 below, specifically configured to perform various steps, functions, and/or operations for estimating video QoE metrics from encrypted network traffic, as described herein.

System 100 may also include a content distribution network (CDN) 170. In one example, CDN 170 may be operated by a different entity from telecommunication network 110. In another example, CDN 170 may be operated by a same entity as telecommunication network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as telecommunication network 110, content providers associated with server(s) 149 in other network(s) 140, and so forth. In one example, edge server 174 may comprise an adaptive bitrate streaming video server.

As mentioned above, TV servers 112 in telecommunication network 110 may also include one or more interactive TV/video-on-demand (VoD) servers and/or network-based DVR servers. In one example, an interactive TV/VoD server and/or DVR server may comprise all or a portion of a computing device or system, such as computing system 400, and/or processing system 402 as described in connection with FIG. 4 below, specifically configured to perform various steps, functions, and/or operations in connection with estimating video QoE metrics from encrypted network traffic, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client for requesting and receiving a manifest file for an adaptive bitrate streaming video, as described herein. For example, STB/DVR 162A may present a user interface and receive one or more inputs (e.g., via remote control 168A) for a selection of an adaptive bitrate streaming video. STB/DVR 162A may request the video from an interactive TV/VoD server and/or network-based DVR server, which may retrieve a manifest file for the video from one or more of application servers 114 and provide the manifest file to STB/DVR 162A. STB/DVR 162A may then obtain video chunks of the video as identified in the manifest file.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video may comprise, for example, one of the servers 149 or one of the TV servers 112. The chunks of the video may be obtained from an origin server via ingest server 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 176A, 167B, 157A or 157B obtaining a manifest file for a video from one of the TV servers 112, from one of servers 149, etc., and requesting and obtaining video chunks of the video from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video to the requesting device, etc. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in customer premises network 160 via access network 120, e.g., an ISP network. In another example, edge server 174 may deliver video chunks to a requesting device in customer premises network 160 via telecommunication network 110 and access network 120. In still another example, edge server 174 may deliver video chunks to a requesting device such as mobile device 157A or 157B via telecommunication network 110 and wireless access network 150.

In accordance with the present disclosure, aspects of the system 100 may provide a system (e.g., a processing system) capable of estimating video QoE metrics from encrypted network traffic. For example, test controller 115 may reconstruct video sessions from encrypted packets of a TCP flow, as discussed below in connection with FIG. 2. The test controller 115 may also use a reconstructed video session as a starting point for inferring one or more user-perceived QoE metrics for the video session, and may recommend one or more changes to the network to improve the QoE metrics.

It should be noted that the system 100 may be implemented in a different form than that which is illustrated in FIG. 1, or may be expanded by including additional endpoint devices, access networks, network elements, application servers, etc. without altering the scope of the present disclosure. For example, telecommunication network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth. Thus, these and other modification are all contemplated within the scope of the present disclosure.

Figure 2:
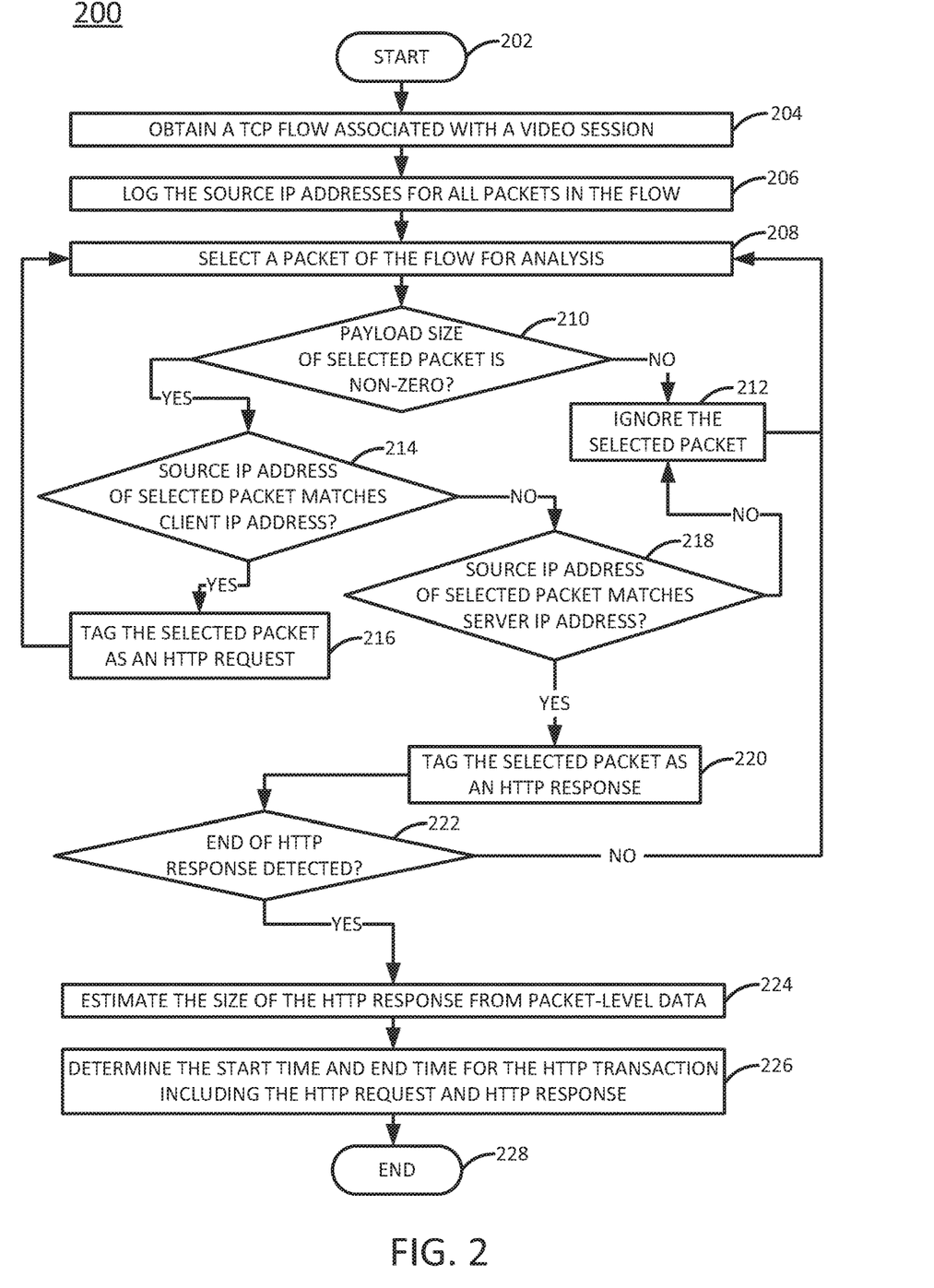
FIG. 2 illustrates an example method for reconstructing a video session from encrypted network traffic.

FIG. 2 illustrates an example method 200 for reconstructing a video session from encrypted network traffic. The method 200 may be used to reconstruct individual HTTP transactions in a TCP flow, where each HTTP transaction may correspond to one chunk of a video. The method 200 may be performed, for instance, by the TC 115 of FIG. 1, or by one or more of the application servers 114 of FIG. 1. The method 200 could also be performed by one or more of the or one or more of the mobile devices 157A, 157B, 167A, 167B or one or more of the home network devices such as the home gateway 161, STB/DVRs 162A and 162B, TVs 163A and 163B, phone 164, or PC 166. In another example, the method 200 may be performed by a computing device or system, such as computing system 400, and/or processing system 402 as described in connection with FIG. 4 below. Although reference may be made to one or more of these devices in connection with the method 200, such references are not intended to limit the means by which the method 200 may be performed.

The method 200 begins in step 202. In step 204, a TCP flow associated with a video session (e.g., a HAS video session), may be obtained. A "flow" within this context refers to a series of data packets exchanged between two network endpoints, i.e., a server hosting a video and a client consuming the video. Data packets belonging to the same flow will typically contain the same flow key, which may comprise a 5-tuple of the source IP address, the destination IP address, the source port number (e.g., Transmission Control Protocol/User Datagram Protocol or TCP/UDP port number), the destination port number (e.g., TCP/UDP port number), and the type of service (ToS). More generally, the flow key defines the TCP/IP connection via which the data packets travel.

In step 206, the source IP addresses for all packets in the flow may be logged. Logging of the source IP addresses allows for reconstruction of an HTTP transaction from the packets as described in the following steps. In one example, logging of the source IP addresses is also performed for packets comprising TCP retransmissions.

In step 208, a packet (e.g., a first packet) from the flow (and whose source IP address has been logged) may be selected for analysis. In one example, packets are selected for analysis according to the order of the time stamps associated with the packets (e.g., packets are selected in the order they are sent).

In step 210, it is determined whether a size of the selected packet's payload is nonzero. If it is determined in step 210 that the size of the selected packet's payload is zero (e.g., as may be the case if the packet contains a TCP ACK message), then the method 200 may proceed to step 212, where the selected packet is ignored. The method 200 may then return to step 208 and select a new packet (e.g., a second packet) for analysis.

If, however, it is determined in step 210 that the size of the selected packet's payload is non-zero, then the method 200 may proceed to step 214. In step 214, it is determined whether the selected packet's source IP address matches the IP address of the client associated with the flow.

If it is determined in step 214 that the selected packet's source IP address matches the IP address of the client associated with the flow, then the method 200 proceeds to step 216. In step 216, the selected packet is tagged as an HTTP request. The method 200 may then return to step 208 and select a new packet (e.g., a second packet) for analysis.

If, however, it is determined in step 214 that the selected packet's source IP address does not match the IP address of the client associated with the flow, then the method 200 proceeds to step 218. In step 218, it is determined whether the selected packet's source IP address matches the IP address of the server associated with the flow.

If it is determined in step 218 that the selected packet's source IP address matches the IP address of the server associated with the flow, then the method 200 proceeds to step 220. In step 220, the selected packet is tagged as an HTTP response corresponding to a previously tagged HTTP request.

If, however, it is determined in step 220 that the selected packet's source IP address does not match the IP address of the server associated with the flow, then the method 200 may proceed to step 212, where the selected packet is ignored. The method 200 may then return to step 208 and select a new packet (e.g., a second packet) for analysis.

In step 222, it is determined whether the end of the HTTP response has been detected. In one example, the end of the HTTP response may be identified by the occurrence of one or more predefined conditions. These predefined conditions may include: (1) the occurrence of a subsequent HTTP request belonging to the same flow (e.g., detected as described above in connection with steps 210-216); (2) a period of inactivity (e.g., no packets, or no packets having non-zero payloads) in the flow that lasts longer than a predefined period of time (e.g., x seconds); or (3) the closing of the TCP connection between the client and the server (e.g., as indicated by a TCP RST or FIN flag).

If it is determined in step 222 that the end of the HTTP response has not been detected, then the method 200 may return to step 208 and select a new packet (e.g., a second packet) for analysis. If, however, it is determined in step 222 that the end of the HTTP response has been detected, then the method 200 may proceed to step 224.

In step 224, the size of the HTTP response may be estimated from packet-level data (e.g., without decrypting the packets). In one example, the size of the HTTP response is estimated by adding the sizes of the payloads of the individual packets making up the HTTP response.

In step 226, the start time and the end time for the HTTP transaction may be determined. In one example, the start time is obtained from the time stamp of the first packet tagged as an HTTP request, while the end time is obtained from the time stamp of the last packet tagged as part of the corresponding HTTP response.

The method 200 may end in step 228.

Thus, applying the method 200 to all TCP flows in a video session, the HTTP transactions (e.g., download of video "chunks") of the video session can be reconstructed (along with the respective sizes, download start times, and download end times for the HTTP transactions). Additionally the method 200 can also be extended to reconstruct video sessions conducted using UDP-based transport protocols such as QUIC. In the case of QUIC, however, the method 200 may not account for retransmissions or use TCP flags to detect the ends of responses. In either case, once the video session has been reconstructed, it can be analyzed to infer the QoE experienced by the client during the video session.

Figure 3:
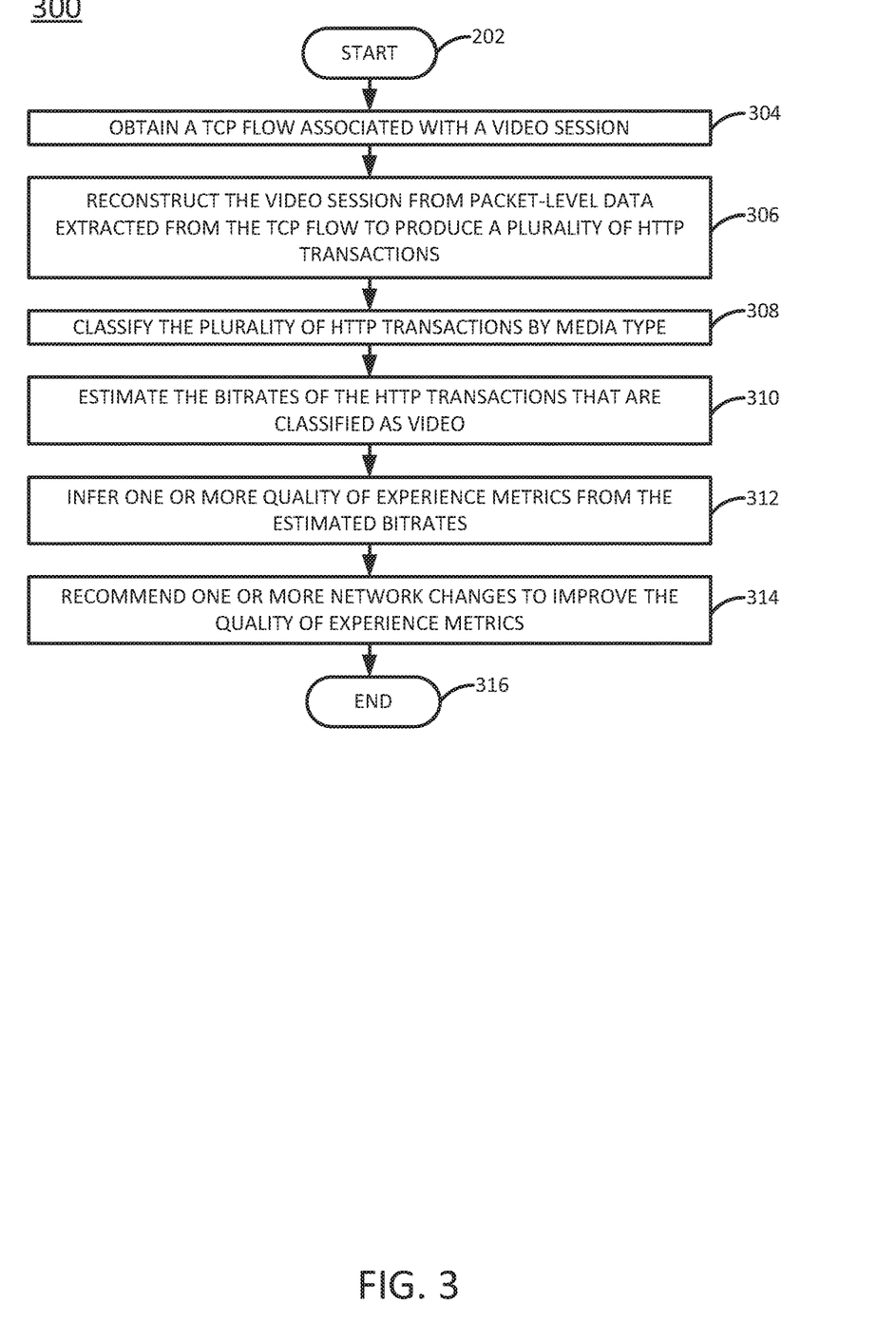
FIG. 3 illustrates an example method for estimating the user-perceived Quality of Experience for a media that is delivered via encrypted network traffic.

FIG. 3 illustrates an example method 300 for estimating the user-perceived Quality of Experience for a video that is delivered via encrypted network traffic. The method 300 may be performed, for instance, by the TC 115 of FIG. 1, or by one or more of the application servers 114 of FIG. 1. The method 300 could also be performed by one or more of the or one or more of the mobile devices 157A, 157B, 167A, 167B or one or more of the home network devices such as the home gateway 161, STB/DVRs 162A and 162B, TVs 163A and 163B, phone 164, or PC 166. In another example, the method 300 may be performed by a computing device or system, such as computing system 400, and/or processing system 402 as described in connection with FIG. 4 below. Although reference may be made to one or more of these devices in connection with the method 300, such references are not intended to limit the means by which the method 300 may be performed.

The method 300 begins in step 302. In step 304, a TCP flow associated with a video session (e.g., a HAS video session), may be obtained.

In step 306, the video session may be reconstructed from packet-level data extracted from the TCP flow (e.g., without decrypting the packets). For instance, the video session may be reconstructed according to the method 200 illustrated in FIG. 2 and described above to produce a plurality of HTTP transactions.

In step 308, the transactions of the reconstructed video session may be classified and tagged by media type. The transactions may include multiple media types, such as video, audio, and metadata. For instance, some video streaming services may separate audio and video content so that the audio and video content appear as separate transactions in the network traffic. In addition, the manifest file for a video will be contained in metadata. Thus, in order to accurately model a video session, it may be useful to identify which of the transactions are video (and audio, if separated) chunks and which transactions are metadata (which can be filtered out when modeling the video session).

In one example, classification of the transactions may be based on the estimated sizes of the HTTP responses (e.g., as estimated in step 224 of the method 200). This is because the size of a metadata transaction (which contains all or mostly text) is generally smaller than the size of an audio or video transaction. Thus, in one example, a transaction whose HTTP response size is greater than or equal to a first predefined threshold, $S_{min}$, may be classified as a video or audio transaction. Conversely, a transaction whose HTTP response size is less than the first predefined threshold $S_{min}$ may be classified as a metadata transaction. In one example, the size of the predefined threshold is based on the minimum bitrate levels of video and audio for the video session, which may be obtained by inspecting the manifest files of several videos.

Furthermore, for services that separate video and audio transactions, further differentiation between video and audio transactions may be based on the audio bitrates used. In one example, a transaction whose HTTP response audio bitrate falls within a predefined range (e.g., between $A_{min}$ and $A_{max}$) may be classified as an audio transaction. Conversely, a transaction whose HTTP response audio bitrate falls outside of the predefined range may be classified as a video transaction. In one example, differentiation is based on a range of audio bitrate values rather than a single audio bitrate value for two main reasons: (1) even when constant bitrate (CBR) encoded, variations in the sizes of audio chunks are likely to be relatively small; and (2) the estimated size of an HTTP response may be prone to error. In a further example, the audio and video content downloaded may be tracked in seconds to avoid misclassifying a video chunk whose HTTP response size falls within the predefined range. In this example, a second predefined threshold, $T_{ahead}$, may be defined such that the audio content downloaded so far is no more than $T_{ahead}$ seconds more than the video content downloaded so far. In another example, the second predefined threshold $T_{ahead}$ could be set as a percentage of the downloaded video content.

Thus, according to step 308, a transaction may be classified as metadata if the HTTP response size is smaller than the first predefined threshold $S_{min}$; as audio if the HTTP response size falls within the predefined range $A_{min}$-$A_{max}$ and if the audio content downloaded is no more than $T_{ahead}$ seconds more than the video content downloaded; or video otherwise. Once the transactions of the video session have been classified, the method 300 proceeds to step 310.

In step 310, the bitrates of the transactions that are identified as video are estimated. Estimating the bitrates of the individual video chunks will help with estimating the average bitrate of the video session and with identifying bitrate switches. In one example, estimation of a video chunk bitrate in accordance with step 310 exploits the fact that many video players switch bitrate when the network bandwidth changes.

In particular, one example estimates a video chunk, i's, bitrate by first dividing the video chunk's estimated size by the video chunk's duration (both of which may be determined in accordance with step 306). The bitrate that is nearest to the dividend, $Q_i$, is then estimated to be the video chunk's bitrate. If the bitrate $Q_i$ of the video chunk i is equal to the bitrate, $Q_{i-1}$, of the immediately previous video chunk in the video session, i-1, then the estimated bitrate $Q_i$ for the video chunk i may be assumed to be correct.

However, if the bitrate $Q_i$ of the video chunk i is not equal to the bitrate, $Q_{i-1}$, of the immediately previous video chunk in the video session, i-1, then the estimated bitrate $Q_i$ for the video chunk i may be modified. In one example, modification of the estimated bitrate $Q_i$ is performed by first comparing the observed download throughput $T_{i-1}$ and $T_{i-2}$ for the two immediately previous video chunks in the video session, i-1 and i-2, respectively. If the absolute value of the difference between the observed download throughput for the two immediately previous video chunks (i.e., $|T_{i-1}-T_{i-2}|$) is greater than or equal to the absolute value of the difference in bitrate between the video chunk i and the immediately previous video chunk (i.e., $|Q_i-Q_{i-1}|$), then this may indicate a change in network throughput. Moreover, if $(T_{i-1}-T_{i-2}) \times (Q_i-Q_{i-1})$ is greater than zero, this may indicate that the change in network throughput occurs in the same direction as the bitrate switch. If a change in network throughput is detected, and if that change in network throughput occurs in the same direction as the bitrate switch, then the bitrate of the video chunk i may be adjusted up or down accordingly. In one example, where the bitrate is adjusted up, the method 300 may also check to verify that the observed network throughput for the immediately previous video chunk (i.e., $T_{i-1}$) is greater than video chunk i's estimated bitrate $Q_i$. However, for the two immediately previous video chunks i-1 and i-2, the bitrates are estimated by dividing the estimated size by the duration, as discussed above, since there is not enough information about throughput.

Thus, once step 310 is performed for the video session, the method 300 has reconstructed a sequence of video chunks from the video session, and estimated the respective download start times ($ST_i$), download end times ($ET_i$), and bitrates ($Q_i$) for each of the video chunks. With this information, the method 300 may proceed to step 312.

In step 312, one or more client-side QoE metrics for the video session may be inferred from the estimated bitrates. In one example the QoE metrics that may be estimated include average bitrate, re-buffering ratio, bitrate switches, and/or startup delay.

For instance, average bitrate may be estimated by taking an average of the estimated bitrates of the video chunks that make up the video session. Mathematically, the average bitrate, br, may be expressed as:

$$br = \frac{\sum_{i=1}^{N} Q_i}{N} \qquad (\text{EQN. 1})$$

where N denotes the number of video chunks in the video session.

Intuitively, re-buffering time is estimated by comparing the video chunks that have been downloaded to the portion of the video content that should have been played so far. The size of a video buffer just before video chunk i was downloaded may be indicated as $B_i$. The re-buffering time between two consecutive chunk download times, $ET_i$ and $ET_{i-1}$, may be indicated as $b_i$. The index of the chunk after which playback resumed since the last re-buffering event may be indicated as j, while the minimum number of chunks required in the buffer to start playback may be indicated as CTS. Thus, in the beginning, j=CTS and $b_k$=0 for k≤CTS, since the waiting time before video startup is considered as startup delay. Then, for every subsequent video chunk i, the size $B_i$ of the video buffer just before download of the video chunk i may be calculated as:

$$B_i = \max((i-1-j+CTS) \times L - (ET1-ET_j), 0) \qquad (\text{EQN. 2})$$

In the case of EQN. 2, L represents the chunk duration (e.g., in seconds), (i-1-j+CTS) represents the video content that has been downloaded, and ($ET_i-ET_j$) represents the total video that should have been played since the playback last began. Thus, if $B_i>0$, then $b_i=0$, and analysis may move to the next video chunk i+1. Otherwise, it is assumed that re-buffering has occurred. In one example, the re-buffering time may be calculated as:

$$b_i = (ET_i - Et_j) - (i - 1 - j + CTS) \times L \qquad (EQN. 3)$$

In the case of EQN. 3, video playback would begin after downloading CTS chunks. Thus, the value of j may be set to i+CTS+1, and $b_k$ for the video chunk $k \in \{i+1, i+CTS-1\}$ may be set to $ET_k - ET_{k-1}$. The remaining re-buffering time $b_i$ values may be calculated in a similar manner.

The re-buffering ratio, rr, may then be calculated as:

$$rr = \frac{\sum_{k=1}^{N} b_k}{N \times L + \sum_{k=1}^{N} b_k} \qquad (EQN. 4)$$

In one example, the number of bitrate switches may be calculated by counting the total number of times that the estimated bitrate changed between consecutive video chunks. This number may be normalized by the total video session duration, and the bitrate switches per minute, SPM, may be calculated as:

$$SPM = \frac{\sum_{i=2}^{N} I(Q_i \neq Q_{i-1}) \times 60}{N \times L} \qquad (EQN. 5)$$

In the case of EQN. 5, I is an indicator function, which equals one when the consecutive chunks do not have the same bitrate and equals zero otherwise.

In one example, the time taken to download a minimum number of video chunks to begin playback, denoted by TTNC, may be taken as a proxy for startup delay. Normally, startup delay, SL, may be defined as the time taken to play the video from the time the user opened the video, and may constitute the following delays:

$$SL = T_{loading} + TTNC + T_{decode} \qquad (EQN. 6)$$

In the case of EQN. 6, $T_{loading}$ denotes the time to prepare the video, including delays like rights management. $T_{decode}$ denotes the time to decode and render the downloaded video chunks on-screen. $T_{loading}$ and $T_{decode}$ are mostly application-induced, while TTNC depends upon the network. A network operator may wish to monitor only the network contribution to startup delay (i.e., TTNC), since improving the network would not directly impact $T_{loading}$ and $T_{decode}$. Thus, TTNC can be used as a proxy for startup delay, as noted above.

Once the client-side QoE metrics for the video session are inferred, the method 300 may proceed to step 314. In step 314, one or more changes to the network may be recommended in order to improve the QoE. In one example, changes may be recommended if one or more of the inferred QoE metrics fails to meet a predefined threshold.

For example, if the QoE metrics indicate that specific cell sites are routinely performing poorly (e.g., failing to meet a threshold QoE metric), then the network operator may wish to target network capacity upgrades to the poorly performing cell sites. Conventional tools that rely on low-level counters at coarse granularity cannot detect when the customer experience for video streaming (which has been estimated to account for at least fifty percent of all cellular traffic) is degraded.

It is also possible to establish a threshold-based process for triggering carrier additions based on QoE. For instance, video applications tend to stream higher video bitrates than necessary for small screens, which can create a data load that triggers traditional alarms for detecting needs for extra capacity. As an example, an alarm may be triggered when throughput drops below 3 Mbps, even though a small screen may only require a throughput of about 1.5 Mbps for traditional over the top (OTT) video to maintain acceptable customer experience.

The method 300 ends in step 316.

Although not expressly specified above, one or more steps of the methods 200 and 300 may include a storing, displaying and/or outputting step as required for a particular application. In other words, any data, records, fields, and/or intermediate results discussed in the methods can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure. The methods 200 and 300 may also be expanded to include additional steps. Thus, these and other modifications are all contemplated within the scope of the present disclosure.

It should also be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated. Similarly, as referred to herein, the term "first" is used simply as a label and does not imply that a packet, transaction, or video chunk necessarily relates to a beginning segment of a video (although in one example it could be).

FIG. 4 depicts a high-level block diagram of a computing device or processing system specifically programmed to perform the functions described herein. For example, any one or more components or devices illustrated in FIG. 1 or described in connection with the example methods 200 or 300 may be implemented as the system 400. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for estimating the user-perceived Quality of Experience for a video that is delivered via encrypted network traffic, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 200 or method 300 as discussed above is implemented in a distributed or parallel manner for a particular illustrative example, i.e., the steps of the above method 200 or method 300 are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 and/or method 300. In one example, instructions and data for the present module or process 405 for estimating the user-perceived Quality of Experience for a video that is delivered via encrypted network traffic (e.g., a software program comprising computer-executable instructions) can be loaded into memory 404 and executed by hardware processor element 402 to implement the steps, functions, or operations as discussed above in connection with the illustrative method 200 and/or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for estimating the user-perceived Quality of Experience for a video that is delivered via encrypted network traffic (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method, comprising:
obtaining, by a processing system including at least one processor, a transport control protocol flow associated with a video session that streams a video from a server to a client, wherein the transport control protocol flow comprises a plurality encrypted packets exchanged between the server and the client; and
reconstructing, by the processing system, a hypertext transfer protocol transaction that is part of the streaming video session, wherein the reconstructing is performed without decrypting the plurality of encrypted packets, wherein the reconstructing comprises:
identifying, by the processing system, a first packet of the plurality of encrypted packets containing a hypertext transfer protocol request associated with a video chunk that is part of the streaming session;
identifying, by the processing system, a second packet of the plurality of encrypted packets containing a hypertext transfer protocol response associated with the hypertext transfer protocol request; and
identifying, by the processing system, an end of the hypertext transfer protocol response.

2. The method of claim 1, wherein the identifying the first packet comprises:
detecting, by the processing system, that a size of a payload of the first packet is nonzero; and
detecting, by the processing system, that a source Internet Protocol address of the first packet matches an Internet Protocol address of the client.

3. The method of claim 1, wherein the identifying the second packet comprises:
detecting, by the processing system, that a size of a payload of the second packet is nonzero; and
detecting, by the processing system, that a source Internet Protocol address of the second packet matches an Internet Protocol address of the server.

4. The method of claim 1, wherein the identifying the end of the hypertext transfer protocol response comprises:
detecting, by the processing system, an occurrence of a third packet of the plurality of packets, wherein the third packet has a timestamp subsequent to a timestamp of the second packet, wherein the third packet belongs to the transport control protocol flow, and wherein the third packet contains a hypertext transfer protocol request.

5. The method of claim 1, wherein the identifying the end of the hypertext transfer protocol response comprises:
detecting, by the processing system, a period of inactivity in the transport control protocol flow that lasts longer than a predefined period of time.

6. The method of claim 1, wherein the identifying the end of the hypertext transfer protocol response comprises:

detecting, by the processing system, a closing of a transport control protocol connection between the server and the client.

7. The method of claim 1, further comprising:
determining, by the processing system, a start time for the hypertext transfer protocol transaction from a time stamp of the first packet; and
determining, by the processing system, an end time for the hypertext transfer protocol transaction from a time stamp of a last packet of the plurality of packets that is part of the hypertext transfer protocol response.

8. The method of claim 1, further comprising:
estimating, by the processing system, a size of the hypertext transfer protocol response by adding payload sizes of all packets of the plurality of packets that are contained in the hypertext transfer protocol response, including the first packet and the second packet.

9. The method of claim 8, further comprising:
inferring, by the processing system, a metric indicative of a quality of experience associated with a viewing of the video at the client, wherein the metric is inferred from the size of the hypertext transfer protocol response.

10. The method of claim 9, wherein the inferring comprises:
classifying, by the processing system, the hypertext transfer protocol transaction as a video chunk;
estimating, by the processing system, a bitrate of the video chunk; and
calculating, by the processing system, the metric based on the bitrate.

11. The method of claim 10, wherein the classifying comprises:
determining, by the processing system, that the size of the hypertext transfer protocol response is at least as large as a predefined threshold size;
determining, by the processing system, that an audio bitrate of the hypertext transfer protocol response falls outside a predefined audio bitrate range; and
determining, by the processing system, that an amount of audio content downloaded by the client during the video session is no more than a predefined threshold time ahead of an amount of video content downloaded by the client during the video session so far.

12. The method of claim 10, wherein estimating the bitrate comprises:
dividing, by the processing system, the size of the hypertext transfer protocol response by an estimated duration of the hypertext transfer protocol response to produce a dividend; and
assigning, by the processing system, an estimated bitrate to the hypertext transfer protocol response, wherein the estimated bitrate is one of a plurality of predefined bitrates, wherein the one of the plurality of predefined bitrates is closest to the dividend.

13. The method of claim 12, wherein estimating the bitrate further comprises:
adjusting, by the processing system, the estimated bitrate to account for an observed change in throughput of a network over which the video session is conducted.

14. The method of claim 13, wherein the observed change in throughput is observed when an absolute value of a difference between observed download throughput for two video chunks downloaded by the client immediately previous to the hypertext transfer protocol response is at least as great as an absolute value of a difference in bitrate between the hypertext transfer protocol response and a video chunk downloaded by the client immediately previous to the hypertext transfer protocol response.

15. The method of claim 10, wherein the calculating comprises:
calculating, by the processing system, an average bitrate of the video session as an average of estimated bitrates for all video chunks of the video session.

16. The method of claim 10, wherein the calculating comprises:
calculating, by the processing system, a re-buffering time of the video session as
$(ET_i-Et_j)-(i-1-j+CTS) \times L$, wherein $(i-1-j+CTS)$ comprises a total amount of video content that has downloaded in the video session so far, L comprises a duration of video chunks downloaded, and $(ET_i-Et_j)$ comprises a total amount of video that should have been played by the client since playback of the video last began.

17. The method of claim 10, wherein the calculating comprises:
calculating, by the processing system, a startup delay of the video session as an amount of time taken to download a predefined minimum number of video chunks to begin playback of the video.

18. A non-transitory computer-readable medium storing instructions which, when executed by a processing system including at least one processor, cause the processing system to perform operations, the operations comprising:
obtaining a transport control protocol flow associated with a video session that streams a video from a server to a client, wherein the transport control protocol flow comprises a plurality encrypted packets exchanged between the server and the client; and
reconstructing a hypertext transfer protocol transaction that is part of the streaming video session, wherein the reconstructing is performed without decrypting the plurality of encrypted packets, wherein the reconstructing comprises:
identifying a first packet of the plurality of encrypted packets containing a hypertext transfer protocol request associated with a video chunk that is part of the streaming session;
identifying a second packet of the plurality of encrypted packets containing a hypertext transfer protocol response associated with the hypertext transfer protocol request; and
identifying an end of the hypertext transfer protocol response.

19. A device, comprising:
a processing system including at least one processor; and
a computer-readable medium storing instructions which, when executed by the processing system, cause the processing system to perform operations, the operations comprising:
obtaining a transport control protocol flow associated with a video session that streams a video from a server to a client, wherein the transport control protocol flow comprises a plurality encrypted packets exchanged between the server and the client; and
reconstructing a hypertext transfer protocol transaction that is part of the streaming video session, wherein the reconstructing is performed without decrypting the plurality of encrypted packets, wherein the reconstructing comprises:
identifying a first packet of the plurality of encrypted packets containing a hypertext transfer protocol request associated with a video chunk that is part of the streaming session;

identifying a second packet of the plurality of encrypted packets containing a hypertext transfer protocol response associated with the hypertext transfer protocol request; and identifying an end of the hypertext transfer protocol response.

20. The device of claim 19, wherein the identifying the first packet comprises:

detecting, by the processing system, that a size of a payload of the first packet is nonzero; and detecting, by the processing system, that a source Internet Protocol address of the first packet matches an Internet Protocol address of the client.

\* \* \* \* \*